United States Patent [19]
Nagaraj et al.

[11] Patent Number: 5,805,842
[45] Date of Patent: Sep. 8, 1998

[54] APPARATUS, SYSTEM AND METHOD FOR SUPPORTING DMA TRANSFERS ON A MULTIPLEXED BUS

[75] Inventors: Ravi Nagaraj; Aniruddha Kunda, both of Hillsboro; James Akiyama, Beaverton, all of Oreg.

[73] Assignee: Intel Corporation, Santa Clara, Calif.

[21] Appl. No.: 534,187

[22] Filed: Sep. 26, 1995

[51] Int. Cl.[6] .................................................. G06F 13/00
[52] U.S. Cl. ........................ 395/306; 395/308; 395/309; 395/200; 395/800; 364/242; 364/240
[58] Field of Search .................................. 395/306, 308, 395/309, 281, 288, 478, 200, 181, 325, 500, 280, 800, 750; 364/242.3, 240, 238; 359/121

[56] References Cited

U.S. PATENT DOCUMENTS

| | | | |
|---|---|---|---|
| 4,571,675 | 2/1986 | Stambaugh et al. | 364/200 |
| 4,577,313 | 3/1986 | Sy | 370/88 |
| 4,777,591 | 10/1988 | Chang et al. | 364/200 |
| 5,191,657 | 3/1993 | Ludwig et al. | 395/325 |
| 5,396,602 | 3/1995 | Amini et al. | 395/325 |
| 5,446,869 | 8/1995 | Padgett et al. | 395/500 |
| 5,448,558 | 9/1995 | Gildea et al. | 370/60 |
| 5,450,551 | 9/1995 | Amini et al. | 395/299 |
| 5,471,590 | 11/1995 | Melo et al. | 395/288 |
| 5,495,569 | 2/1996 | Kotzur | 395/181 |
| 5,515,513 | 5/1996 | Metzger et al. | 395/200.15 |
| 5,524,235 | 6/1996 | Larson et al. | 395/478 |
| 5,542,053 | 7/1996 | Bland et al. | 395/309 |
| 5,557,758 | 9/1996 | Bland et al. | 395/308 |
| 5,559,968 | 9/1996 | Stancil et al. | 395/306 |
| 5,642,489 | 6/1997 | Bland et al. | 395/308 |

*Primary Examiner*—Ayaz R. Sheikh
*Assistant Examiner*—Eric Thlang
*Attorney, Agent, or Firm*—Blakely, Sokoloff, Taylor & Zafman

[57] ABSTRACT

An apparatus and method for enabling a Peripheral Component Interconnect ("PCI") bus to support direct memory access ("DMA") transfers. The apparatus comprises a plurality of DMA controllers, a state machine and an internal storage element. The plurality of DMA controllers transfers DMA requests for an electronic device to the state machine and DMA acknowledges from the state machine to the electronic device. The state machine controls the DMA transfer by performing two transactions for each DMA transfer; namely, a memory cycle and an input/output cycle. The internal storage element acts as a buffer for this multiple cycle DMA transfer.

28 Claims, 5 Drawing Sheets

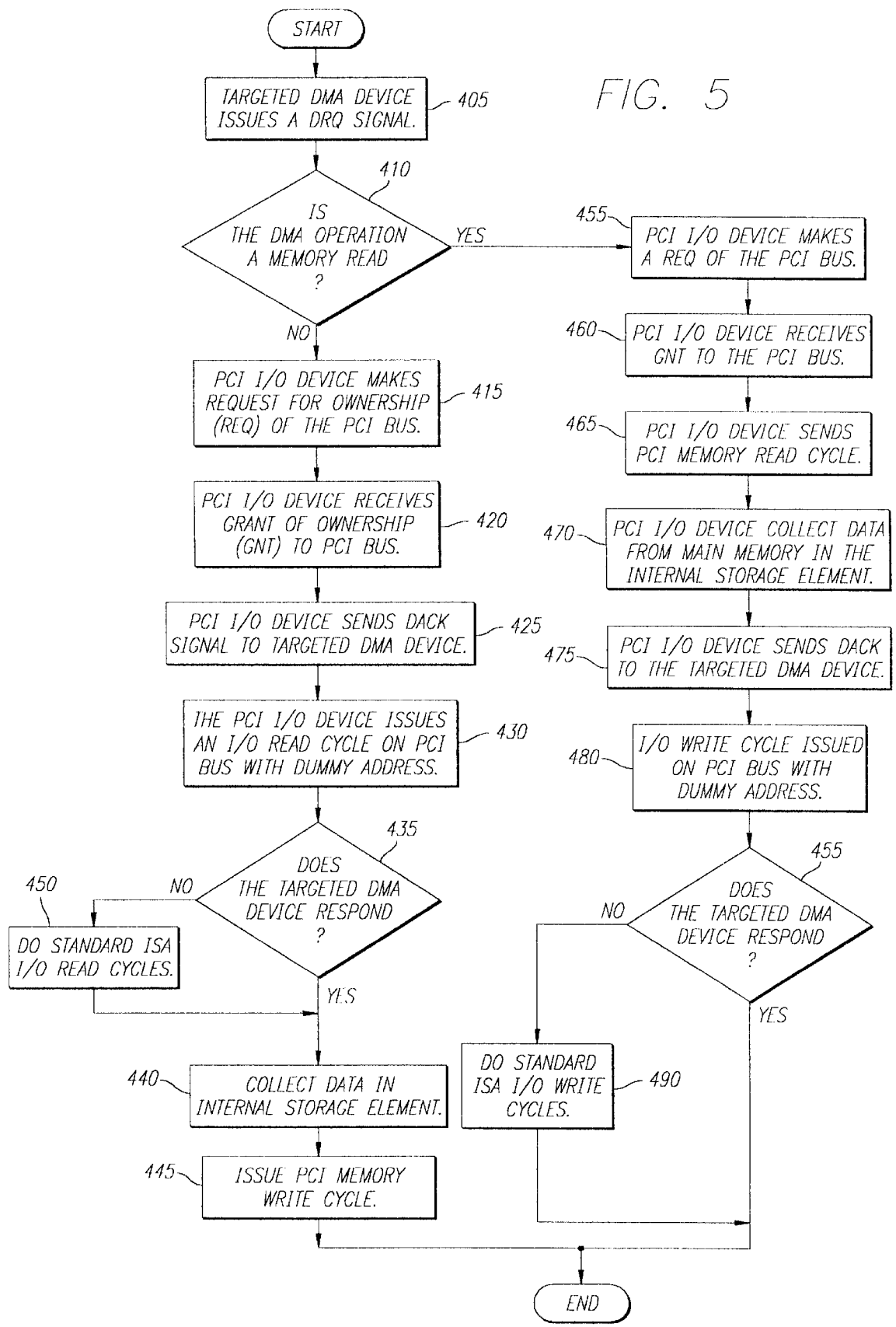

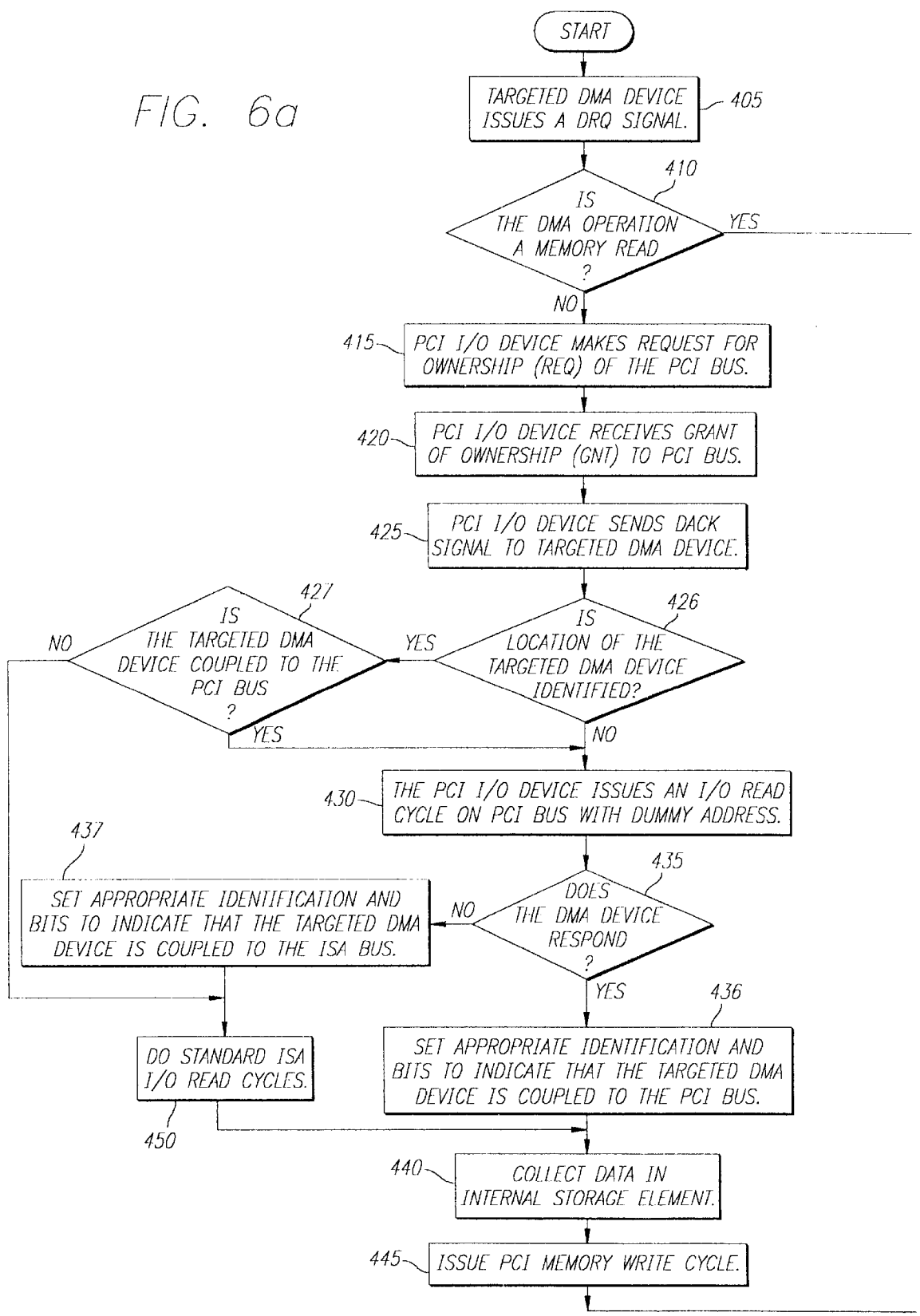

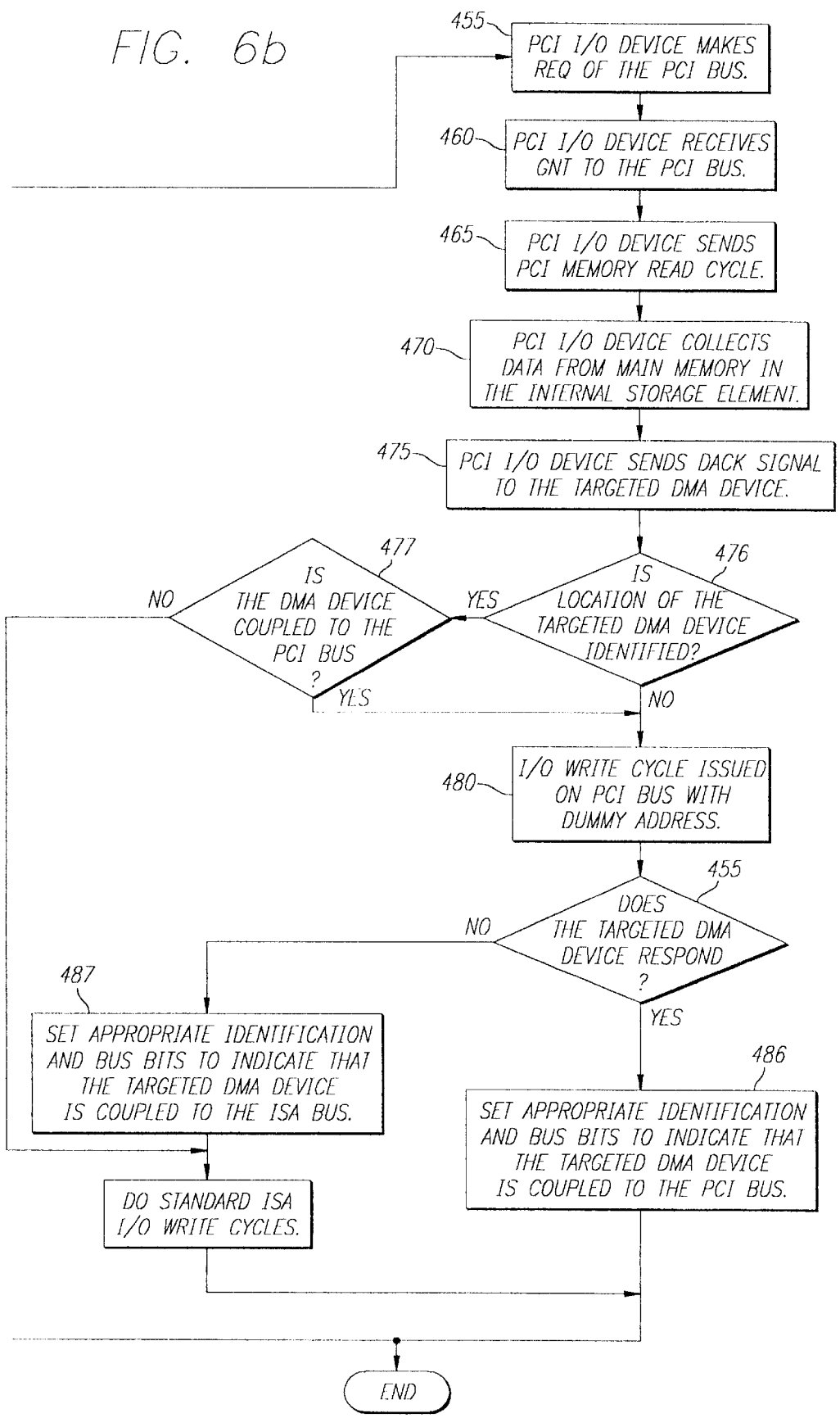

5,805,842

APPARATUS, SYSTEM AND METHOD FOR SUPPORTING DMA TRANSFERS ON A MULTIPLEXED BUS

BACKGROUND OF THE INVENTION

1. Field of the Invention

The present invention relates to the field of computers. More particularly, the present invention relates to an apparatus and method for allowing legacy devices using direct memory access ("DMA") transfers to be moved from an Industry Standard Architecture ("ISA") bus to a Peripheral Component Interconnect ("PCI") bus.

2. Description of Art Related to the Invention

In its early evolution, personal computers ("PCs") were configured with an Industry Standard Architecture ("ISA") bus to provide a communication path between a microprocessor or memory of the PC and various input/output ("I/O") devices such as a modem, a floppy disk drive controller, an audio device and the like. Well known in the industry, the ISA bus is a non-multiplexed bus typically supporting 16-bit data and 24-bit addresses with an operating rate of approximately 8 megahertz ("MHz"). This configuration allows an I/O device, coupled to the ISA bus, to perform a DMA transfer by appropriately signaling a DMA controller (e.g., an Intel® 8237 controller) to establish a DMA channel between that particular I/O device and memory.

For many years, the bus architecture of the PC has remained unchanged. However, as microprocessors became faster and more powerful, a new bus architecture was needed to provide better system performance of the PC. This prompted the creation of a Peripheral Component Interconnect ("PCI") bus which has rapidly gained acceptance in the computer industry. The PCI bus is a multiplexed 32-bit bus configured to operate at a rate of approximately 33 MHz. Unlike the ISA bus which supports DMA transfers through DMA channels, the PCI bus is a multi-master bus which allows one bus master to control one or more bus slaves. A "bus master" is a device (e.g., microprocessor, memory, an I/O device, etc.) which controls a bus by initiating bus cycles. A "bus slave" only receives bus cycles without having a capability of initiating them. These bus masters and bus slaves may be coupled together through a number of interconnects including card slots.

Currently, as shown in FIG. 1, a PC 100 comprises a central processing unit ("CPU") 105, main memory 110 (e.g., random access memory "RAM", read only memory "ROM", cache, etc.) and two distinct buses, namely a PCI bus 120 and an ISA bus 130. More specifically, the CPU 105 and main memory 110 are coupled to a system controller 115, preferably a memory controller, which is coupled to a PCI bus 120 having the characteristics discussed above. The PCI bus 120 is coupled to an ISA bus 130 through a PCI-ISA bridge 125 to establish a communication path between a number of I/O devices 135, coupled to the ISA bus 130, and the CPU 105 or main memory 110.

Well known in the industry, the PCI-ISA bridge 125 includes, among other things, two DMA controllers (e.g., Intel® 8237 controllers), two interrupt controllers and timing mechanisms (not shown). This PCI-ISA bridge 125 allows the I/O devices 135, for example volatile memory (e.g., EEPROM) 140 and a Super I/O 145, access to the main memory 110. The Super I/O 145 is an interface for a real-time clock, devices coupled through parallel and serial ports and a floppy disk drive controller which is able to request DMA transfers as shown by data paths 146–149, respectively. The I/O devices 135 further include other I/O devices 100 like audio devices which can request DMA transfers and "J" card slots 155 (where "J" is an arbitrary whole number) for connecting a modem, an audio device, network card or other devices which may or may not use DMA to the ISA bus.

Typically, most I/O devices 135 connected to the ISA bus 130 can be coupled to the PCI bus 120 in the alternative without incurring any configuration problems. However, those I/O devices using DMA (e.g., floppy disk drive controller, a device 150 coupled to a motherboard and legacy cards using DMA which are inserted into card slots 155, especially those legacy cards used in connection with disk operating system "DOS" based applications) currently cannot be coupled to the PCI bus 120 because the PCI bus 120 does not support DMA. For clarity sake, a device, card, etc., which is coupled to the motherboard and can perform DMA transfers, is generically referred to as a "DMA device." As a result, two distinct types of bus architectures currently are required to be implemented within the PC which poses a number of disadvantages.

One primary disadvantage is that the speed limitations associated the ISA bus preclude certain DMA devices, which can operate at a rate greater than 8 MHz, from operating at their optimal level. Collectively, this precludes the PC from achieving its optimum operating speed. Another disadvantage is that it is more costly for computer manufacturers to support two different types of bus architectures instead of a single bus architecture. Yet another disadvantage is that it is confusing to many computer users as to which I/O devices are coupled to which bus types.

Therefore, it would be advantageous to develop a system which will allow DMA devices, which have been traditionally connected to the ISA bus, to be alternatively coupled to the PCI bus and completely transparent to the operating software.

BRIEF SUMMARY OF THE INVENTION

The present invention relates to an apparatus and corresponding method for enabling a Peripheral Component Interconnect ("PCI") bus to support greater functionality such as direct memory access ("DMA") transfers. The apparatus, coupled to the PCI bus, comprises a plurality of DMA controllers, a state machine and an internal storage element. The plurality of DMA controllers are responsive to a DMA request from one of its DMA devices ("targeted DMA device") by issuing a DMA acknowledge signal once the apparatus is ready to support DMA transfers to be made on the PCI bus. The state machine controls the operations of the apparatus by performing two transactions in response to a DMA request. These transactions include the performance of a memory cycle and an input/output cycle. The internal storage element provides internal buffering to allow a multiple cycle DMA transfer to be performed in lieu of a typical single cycle DMA transfer. Optimally, the apparatus includes a location register to better predict whether the targeted DMA device resides on the PCI bus or on an Industry Standard Architecture bus.

BRIEF DESCRIPTION OF THE DRAWINGS

The features and advantages of the present invention will become apparent from the following detailed description of the present invention in which:

FIG. 5 is an illustrative flowchart setting forth the operational steps necessary to support DMA devices coupled to either the PCI bus and the ISA bus to exchange information with main memory.

FIGS. 6a and 6b collectively are an illustrative flowchart incorporating the operational steps set forth in FIG. 5 as well as additional operational steps to avoid latency resulting from successive checks in locating the DMA device.

DETAILED DESCRIPTION OF THE INVENTION

The present invention describes a system and method for increasing the functionality on a PCI bus by enabling I/O devices using DMA to be supported by the PCI bus. The following detailed description is presented largely in terms of block diagrams and flowcharts which clearly illustrate the present invention in detail but does not discuss well-known circuits or process steps to avoid unnecessarily obscuring the present invention. The flowcharts illustrate a series of steps leading to a desired result. These steps require physical manipulations of physical quantities in the form of electrical or magnetic signals capable of being stored, transferred, combined, compared or otherwise manipulated.

Figure 2:
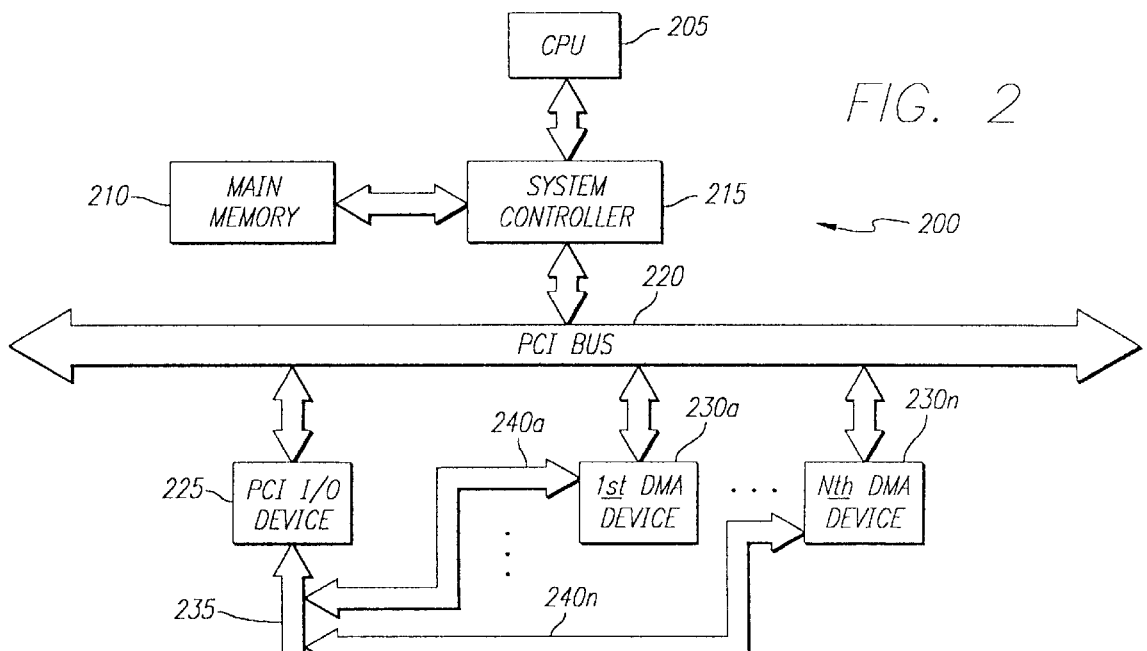
FIG. 2 is an illustrative block diagram of a personal computer having a number of I/O devices using DMA which are coupled to the PCI bus instead of the ISA bus.

Referring to FIG. 2, an illustrative block diagram of an computer system 200 employing the present invention is shown. The computer system 200 comprises a CPU 205 and a main memory element 210 (e.g., RAM, ROM, cache, etc.) coupled to a system controller 215. Preferably operating as a memory controller, the system controller 215 is coupled to a PCI bus 220 which interconnects a number of devices including, but not limited to a PCI I/O device 225 and "n" DMA devices 230a–230n coupled to the motherboard (where "n" is an arbitrary whole number). As in prior systems, the PCI I/O device 225, which acts solely as a bridge, is coupled to an Industry Standard Architecture ("ISA") bus (not shown) through a bus including control lines 235 as shown. However, the PCI I/O device 225 now supports control lines 240a–240n which are used by the DMA devices 230a–230n to exchange information with the PCI I/O device 225 transparent to the operating software.

Figure 3:
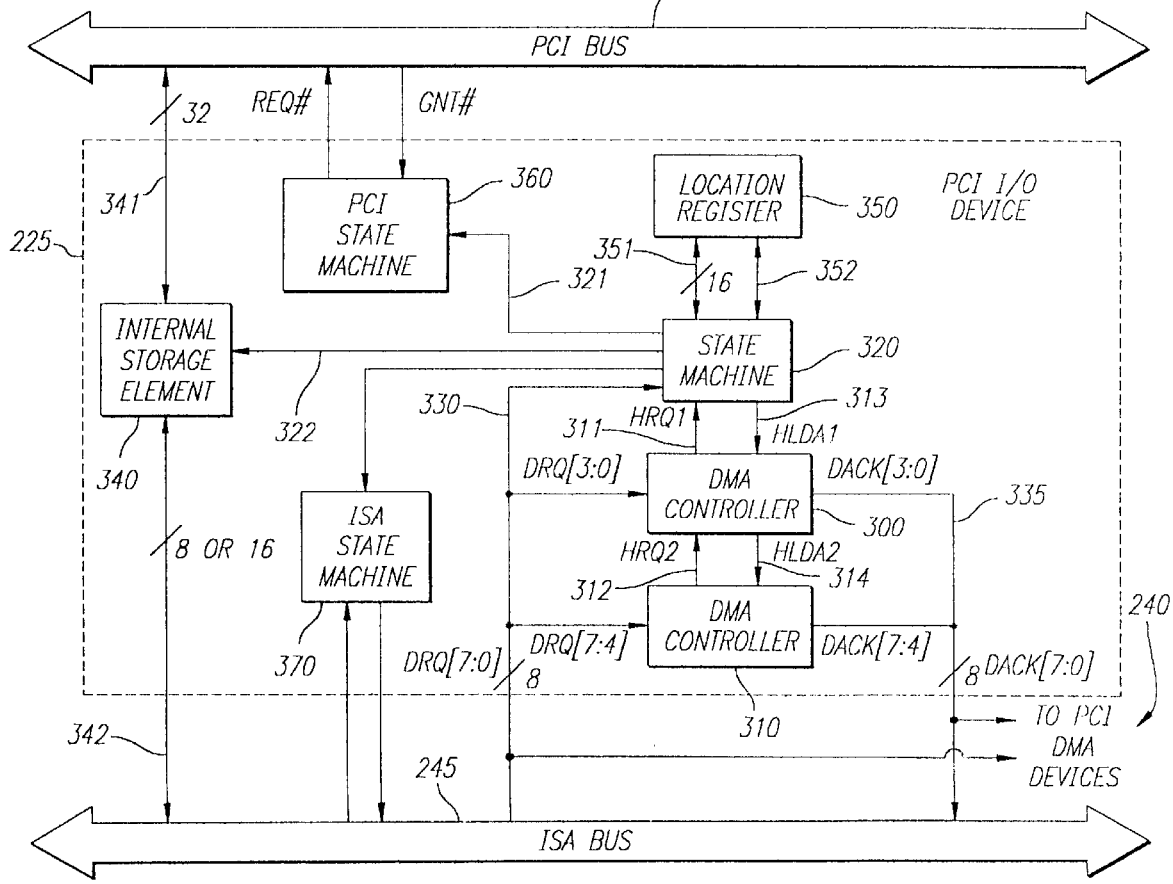
FIG. 3 is an illustrative block diagram of a PCI I/O device including DMA controllers, a state machine, an internal storage element and a location register to collectively control via control lines the operations of the PCI-ISA bridge of FIG. 2.

Referring now to FIG. 3, the PCI I/O device 225 preferably comprises a pair of DMA controllers 300 and 310, a state machine 320, an internal storage element 340, a PCI state machine 360 and an ISA state machine 370. The DMA controllers 300 and 310 (e.g., Intel® 8237 controllers) are coupled to a plurality of DMA Request ("DRQ") control lines 330 and a corresponding plurality of DMA Acknowledge ("DACK") control lines 335. The DRQ control lines 330 are used to signal the DMA controllers 300 and 310 that a DMA device connected to either the ISA bus 245 or to the PCI bus 220 requests a DMA transfer to occur and the DACK control lines 335 are used to indicate that the DMA transfer can begin.

As further shown in FIG. 3, the DMA controller 300 asserting a first Hold Request ("HRQ1") signal via control line 311 into the state machine 320 upon detecting a DMA request from one of its supported DMA devices via DRQ lines 330, namely "DRQ[3:0]". In addition, the DMA controller 310 asserts a second Hold Request ("HRQ2") signal via control line 312 into the DMA controller 300 upon detecting a DMA request from one of its supported DMA devices through the remaining DMA channels "DRQ[7:4]". The DMA controllers 300 and 310 are cascaded together to operate as a collective unit by the HRQ1 signal being asserted by the DMA controller 300 if the HRQ2 signal is asserted to indicate that a DMA request has been received and is awaiting attention. Depending on which DMA channel propagated the DRQ signal, the state machine 320 is able to determine whether the DMA transfer is a memory read or a memory write from DMA command registers in the DMA controller 300 and/or 310. It is contemplated that more than eight (8) DMA channels, as shown, can be supported by the PCI I/O device 225 by increasing the number of DMA controllers.

In response to asserting one of the DRQ lines, the PCI I/O device 225 performs the DMA operation by splitting the operation into two PCI cycles; namely one memory cycle and one I/O cycle. For a DMA memory read operation initiated by a DMA device coupled to the PCI bus, the PCI I/O device 225 (i) issues a PCI memory read cycle and thereafter, (ii) issues an I/O write cycle with a dummy address onto the PCI bus 220. The dummy address is not associated with any hardware device coupled to the PCI bus 220 but is sent for the sake of completeness to check whether the targeted DMA device responds to the I/O write cycle.

More specifically, upon receiving an asserted HRQ1 signal from the DMA controller 300, the state machine 320 signals the PCI state machine 360 via control line 321 to request ownership of the PCI bus 220. Upon the PCI state machine 360 receiving ownership of the PCI bus 220 for the PCI I/O device 225, the PCI state machine 360 places a requested memory address onto the PCI bus 220 to be received by the main memory element (not shown) which, in response, places data onto the PCI bus 220. The state machine 320 asserts a control signal via control line 322 to the internal storage element 340 to receive the data in parallel via data lines 341. The internal storage element 340 operates as a temporary buffer to store a predetermined number of bits (e.g., 32-bits) from memory during a DMA memory read operation and the targeted DMA device during a DMA memory write operation. This is necessary since two PCI cycles are needed to perform a DMA operation.

Thereafter, the state machine 320 asserts a first Hold Acknowledge ("HLDA1") control line 313 which indicates to the DMA controller 300 that the PCI memory read cycle has completed. A second HLDA control line ("HLDA2") 314 is asserted if the targeted DMA device is supported by the DMA controller 310. Thus, the DMA controller supporting the targeted DMA device issues a DACK signal.

Thereafter, the state machine 320 signals the PCI state machine 360 to issue an I/O write cycle on the PCI bus by placing the data stored in the internal storage element 340 and a dummy address onto the PCI bus 220. If the targeted DMA device is coupled to the PCI bus 220, it receives the data and the DMA transfer is completed. However, if there is no response to the I/O write cycle indicating that targeted DMA device is coupled to the ISA bus 245, the state machine 320 requests the ISA state machine 370 to perform multiple ISA I/O write cycles which are well known in the art.

For a DMA memory write operation initiated by the targeted DMA device coupled to the PCI bus 220, the PCI I/O device 225 issues an I/O read cycle with the dummy address and then issues a PCI memory write cycle onto the PCI bus with a memory address. These PCI cycles prevent software from detecting that DMA operations are not being performed by a device coupled to the ISA bus 245.

In particular, the targeted DMA device would assert its corresponding DRQ line 330. In response, the DMA controller 300 would issue the HRQ1 signal. Upon receiving the asserted HRQ1 signal from the DMA controller 300, the state machine 320 signals the PCI state machine 360 via control line 321 to request ownership of the PCI bus 220. Once the PCI bus 220 is acquired, the state machine 320 asserts the HLDA1 control line 313, possibly causing assertion of the HLDA2 control line 314 if responding to a DRQ signal supported by DMA controller 310, to indicate to the DMA controllers 300 and 310 that they can issue a DACK signal to the targeted DMA device. Next, the state machine 320 prompts the PCI state machine 360 to issue an I/O read cycle with a dummy address. If the targeted DMA device responds, it places 32-bits of data at a time into the internal storage element 340 which are written to the main memory element in the next PCI memory write cycle. However, if the targeted DMA device does not respond, suggesting that the targeted DMA device is coupled to the ISA bus 245, the state machine 320 signals the ISA state machine 370 to control data propagation into the internal storage element 340 via data lines 342. Once the internal storage element 340 is full, the state machine 320 signals the PCI state machine 360 to write the data to the main memory element.

Figure 1:
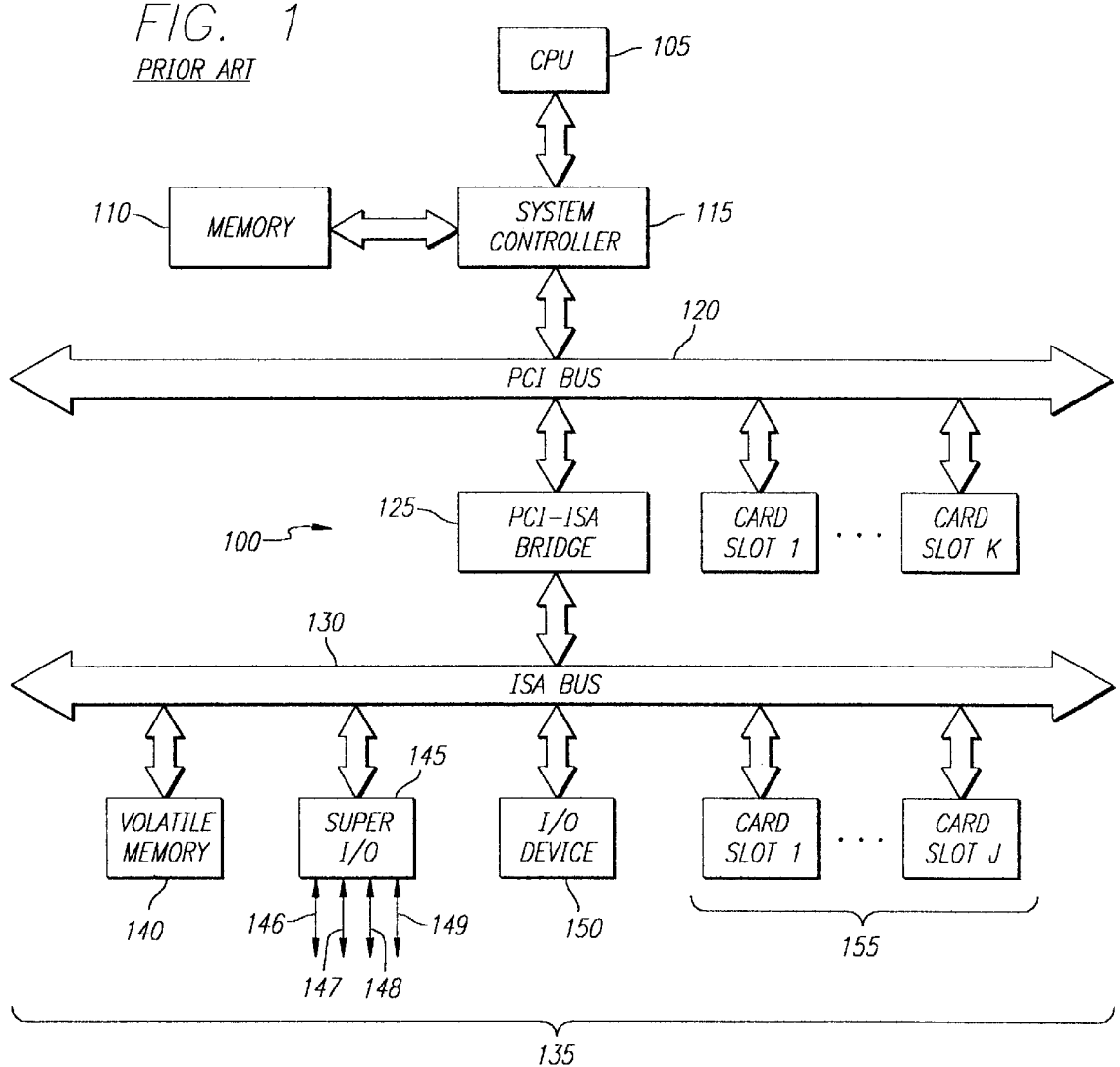
FIG. 1 is an illustrative block diagram of a conventional computer system implementing both an Industry Standard Architecture ("ISA") bus and a Peripheral Component Interconnect ("PCI") bus.
Figure 4:
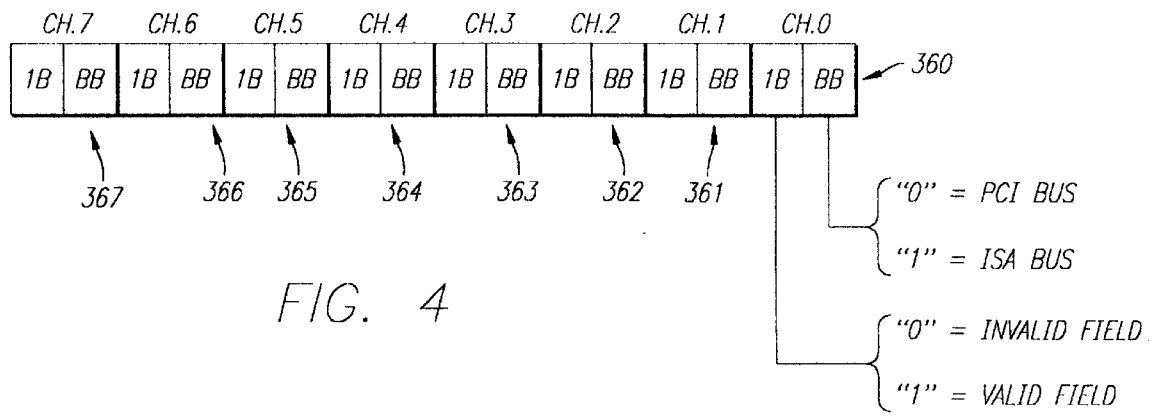
FIG. 4 is an illustrative block diagram of the bit representations of the location register of FIG. 3.

Optionally, a location register 350 may be employed within the PCI I/O device 225. In the preferred embodiment, the location register 350 is coupled to the state machine 320 through a 16-bit data bus 351 and control lines 352. At minimum, a 16-bit data bus is necessary since the location register 350, as shown in FIG. 4, is 16-bits in length since two bits are associated with each potential DMA channel. Since there are two DMA controllers each providing up to 4 DMA channels, a total of 8 DMA channels (labeled "CH") 360–367 can be supported. However, it is contemplated that the location register 350 can be adjusted depending on the number of DMA channels supported by the PCI I/O device 225.

One bit corresponding to each DMA channel is an identification bit ("IB") which, when set (logic level "1") indicates that the bus, on which the targeted DMA device resides, has been previously determined. The "identification" bit gets flushed whenever the I/O address range of the DMA controller is written. The other bit associated with each DMA channel is a bus bit ("BB") which, when cleared (logic level "0"), indicates that a targeted DMA device resides on the PCI bus. Otherwise, if the bus bit is set (logic "1"), the targeted DMA device resides on the ISA bus. Of course, during power-on, the location register 350 is defaulted to "0".

Referring now to FIG. 5, a flowchart illustrates the operational steps performed by the state machine of the PCI I/O device to support DMA transfers by a DMA device coupled to the PCI bus. In Step 405, a DMA device (hereinafter referred to as the "targeted DMA device") issues a DRQ signal to the PCI I/O device requesting DMA. Next, the PCI I/O device determines whether the targeted DMA device is requesting DMA read operation or a DMA write operation trough the DMA command reaisters (Step 410).

If the targeted DMA device is requesting a DMA memory write operation, the PCI I/O device requests ownership of the PCI bus by asserting a request ("REQ") signal transmitted to a PCI bus arbiter typically implemented within the system controller (Step 415). Upon the PCI bus arbiter granting ownership of the PCI bus to the PCI I/O device by returning a grant ("GNT") signal, the PCI I/O device transmits a DMA acknowledge ("DACK") signal to the targeted DMA device (Steps 420 and 425). Thereafter, the PCI I/O device issues an I/O read cycle on the PCI bus with a dummy address (Step 430). The dummy address is a predetermined address unavailable to any device coupled to the PCI bus in order to prevent a device from accidentally claiming the I/O read cycle. As a result, only the targeted DMA device can claim the I/O read cycle, provided the targeted DMA device is coupled to the PCI bus.

In Step 435, a check is made as to whether the targeted DMA device responds to the I/O read cycle within three clock cycles. If the targeted DMA device responds thereby indicating that the targeted DMA device is coupled to the PCI bus, the targeted DMA device transmits data (32-bits every cycle) into the internal storage element of the PCI I/O device (Step 440). After the internal storage element becomes full or the data is the last bytes associated with the DMA write operation, the targeted DMA device issues a PCI memory write cycle to write the data stored in the internal storage element into memory (Step 445). This process continues until all the data associated with the DMA write operation has been transmitted to main memory. However, if the targeted DMA device fails to respond, the PCI I/O device issues (i) an ISA I/O read cycle to the ISA bus in which the targeted DMA device transmits data (8-bits every cycle) into the internal storage element and thereafter (ii) issues the PCI memory write cycle as shown through Steps 440–450.

As still shown in FIG. 5, if the targeted DMA device is requesting a DMA memory read operation, the PCI I/O device requests ownership of the PCI bus and awaits such ownership (Steps 455 and 460). Next, the PCI I/O device issues a PCI memory read cycle onto the PCI bus to obtain data from main memory (Step 465). The PCI I/O device receives this data and temporarily stores the data within the internal storage element (Step 470). Then, the PCI I/O device transmits an acknowledge signal ("DACK") to the targeted DMA device (Step 475). After the internal storage element becomes full or the data is the last bytes associated with the DMA read operation, the PCI I/O device issues an I/O write cycle on the PCI bus with a dummy address (Step 480).

In Step 485, a check is made as to whether the targeted DMA device responds to the I/O write cycle within at most three clock cycles. If the targeted DMA device responds thereby indicating that the targeted DMA device is coupled to the PCI bus, the targeted DMA device has received the data from the internal storage element and the process continues until the all data associated with the DMA has been transmitted to the targeted DMA device. However, as shown in Step 490, if the targeted DMA device fails to respond, the PCI I/O device issues an ISA I/O write cycle to the ISA bus in which the targeted DMA device receives 8-bits of data at a time until the internal storage element is empty.

Referring to FIGS. 6a and 6b, the operations of the state machine are similar to those discussed in FIG. 5 with the exception that flag bits (i.e., "identification" and "bus" bits) of the location register are used to quickly locate DMA devices after its location is previously determined.

As shown in Step 426, after the PCI I/O device sends the DACK signal to the targeted DMA device, a determination is made as to whether the location of the targeted DMA device has been previously determined. This is accomplished by checking whether the identification bit associated with the channel used by the targeted DMA device is set. If it is not set, the processor continues to Step 430, and thereafter, at Step 436 or alternately at Step 437, the appropriate identification and bus bits are set to indicate that the targeted DMA device is coupled to PCI or ISA bus, respectively.

Otherwise, another determination is made as to whether the targeted DMA device is coupled to the PCI bus by determining the logic state of the bus bit corresponding to the above-checked identification bit (Step 427). If so, the process continues to Step 430 but if targeted DMA device is coupled to the ISA bus, the process ignores Steps 430 and 435 and successively performs Steps 450, 440 and 445. It is contemplated that the same type of additional operations occur in the event that the DMA operation is a memory read as shown in Steps 476–477 and 486–487.

The present invention described herein may be designed in many different embodiments evident to one skilled in the art than those described without departing from the spirit and scope of the present invention. The invention should, therefore be measured in terms of the claims which follow.

What is claimed is:

1. An apparatus configured to support a direct memory access transfer on a multiplexed bus between a main memory element and an electronic device, the apparatus comprising:
    a plurality of direct memory access controllers capable of receiving a direct memory access request from the electronic device coupled to the multiplexed bus;
    a state machine coupled to the plurality of direct memory access controllers, the state machine coordinating the direct memory access transfer by separating the direct memory access transfer into at least a memory cycle and an input/output cycle upon detecting that at least one of the plurality of direct memory access controllers has received the direct memory access request; and
    an internal storage element coupled to the state machine, the internal storage element collecting data during the direct memory access transfer.

2. The apparatus according to claim 1, wherein the state machine further coordinating the direct memory access transfer by initially determining whether the direct memory access transfer requested by the electronic device is a memory read operation.

3. The apparatus according to claim 2, wherein if the direct memory access transfer is the memory read operation, the state machine prompts the apparatus to (i) gain ownership of the multiplexed bus, (ii) collect data from the main memory element, (iii) transmit a direct memory access acknowledge signal to the electronic device, and (iv) perform a write cycle on the multiplexed bus by placing the data and a dummy address onto the multiplexed bus.

4. The apparatus according to claim 1, wherein if the direct memory access transfer is a memory write operation, the state machine prompts the apparatus to (i) gain ownership of the multiplexed bus, (ii) transmit a direct memory access acknowledge signal to the electronic device, (iii) collect data from the electronic device and (iv) perform a write cycle on the multiplexed bus by placing the data and an address supported by the main memory element onto the multiplexed bus.

5. The apparatus according to claim 1, wherein the plurality of direct memory access controllers are coupled to the electronic device via a first direct memory access channel of a plurality of direct memory access channels.

6. The apparatus according to claim 5 further comprising a location register indicating if the electronic device is coupled to the multiplexed bus.

7. The apparatus according to claim 6, wherein the location register is coupled to the state machine and includes an identification bit and a bus bit associated with each of the plurality of direct memory access channels.

8. An apparatus configured to support a direct memory access transfer on a Peripheral Component Interconnect bus between a main memory element and an electronic device coupled to the Peripheral Component Interconnect bus, the apparatus comprising:
    controller means for receiving a direct memory access request from the electronic device coupled to the Peripheral Component Interconnect bus;
    state means for receiving the direct memory access request from the plurality of controller means and for separating the direct memory access transfer into at least a memory , cycle and an input/output cycle, the state means being coupled to the controller means;
    storage means for collecting data during the direct memory access transfer, the storage means being coupled to the state means; and
    location means for determining whether the electronic device is coupled to the Peripheral Component Interconnect bus, the location means being coupled to the state means.

9. A computer system comprising:
    a main memory element;
    a multiplexed bus;
    a first electronic device coupled to the multiplexed bus, the first electronic device capable of requesting a direct memory access transfer;
    a bridge device coupled to the main memory element and the first electronic device to enable the direct memory access transfer to be performed between the first electronic device and the main memory element, the bridge device includes a plurality of direct memory access controllers coupled to the first electronic device via a first direct memory access channel in order to receive the direct memory access request from the first electronic device; and
    a location register to indicate if the first electronic device is coupled to the multiplexed bus.

10. The computer system according to claim 9, wherein the bridge device further includes:
    a state machine coupled to the plurality of direct memory access controllers, the state machine coordinates the direct memory access transfer upon detecting that the plurality of direct memory access controllers received the direct memory access request; and
    an internal storage element coupled to the state machine, the internal storage element collects data during the direct memory access transfer.

11. The computer system according to claim 10, wherein the state machine of the bridge device coordinates the direct memory access transfer by separating the direct memory access transfer into a memory cycle and an input/output cycle.

12. The computer system according to claim 10, wherein the state machine of the bridge device coordinates the direct memory access transfer by initially determining whether the direct memory access transfer requested by the first electronic device is a memory read operation.

13. The computer system according to claim 12, wherein if the direct memory access transfer is the memory read operation, the state machine prompts the bridge device to (i) gain ownership of the multiplexed bus, (ii) collect data from the main memory element, (iii) transmit a direct memory access acknowledge signal to the first electronic device and (iv) perform a write cycle on the multiplexed bus by placing the data and a dummy address onto the multiplexed bus.

14. The computer system according to claim 12, wherein if the direct memory access transfer is a memory write operation, the state machine prompts the bridge device to (i) gain ownership of the multiplexed bus, (ii) transmit a direct memory access acknowledge signal to the first electronic device, (iii) collect data from the first electronic device and (iv) perform a write cycle on the multiplexed bus by placing the data and an address supported by the main memory element onto the multiplexed bus.

15. The computer system according to claim 10, wherein the location register, coupled to the state machine, includes an identification bit and a bus bit associated with each of the plurality of direct memory access channels.

16. The computer system according to claim 10, wherein the multiplexed bus is a Peripheral Component Interconnect bus.

17. A method for performing a direct memory access transfer over a multiplexed bus, the method comprising:
(1) detecting a direct memory access request from an electronic device coupled to the multiplexed bus; and
(2) servicing the direct memory access request by performing the direct memory access transfer between a memory element and the electronic device by separating a direct memory access transfer into at least a memory cycle and an input/output cycle.

18. The method according to claim 17, wherein the separating of the direct memory access transfer includes
determining whether the direct memory access request is for a direct memory access memory read; and
if the direct memory access request is for the direct memory access memory read, then performing the following:
(a) obtaining ownership of the multiplexed bus,
(b) collecting data from the memory element into a storage element,
(c) transferring a direct memory access acknowledge signal to the electronic device, and
(d) performing an input/output write cycle by placing the data and a dummy address onto the multiplexed bus.

19. The method according to claim 18, wherein if the direct memory access request is determined to be a direct memory access memory write, performing the following:
(e) obtaining ownership of the multiplexed bus;
(f) transferring a direct memory access acknowledge signal to the electronic device;
(g) performing an input/output read cycle with a dummy address onto the multiplexed bus;
(h) collecting data from the electronic device and storing the data within the storage element; and
(i) performing a write cycle with a memory address on the multiplexed bus.

20. The method according to claim 19, wherein after transferring the direct memory access acknowledge signal to the electronic device and before performing the input/output read cycle, the method comprising:
determining whether a location of the electronic device has been previously identified; and
determining whether the electronic device is coupled to the multiplexed bus if said location has been identified, wherein
performing the input/output cycle if the electronic device is coupled to the multiplexed bus and setting appropriate bits within a location register to store a location of the electronic device for a subsequent direct memory access transfer if the electronic device is coupled to the multiplexed bus, and alternatively
performing multiple input/output read cycles if the electronic device is coupled to an Industry Standard Architecture bus.

21. The method according to claim 18, wherein prior to performing the input/output write cycle by placing the data and the dummy address onto the multiplexed bus, the method comprising:
determining whether a location of the electronic device has been previously identified; and
if said location has been identified, determining whether the electronic device is coupled to the multiplexed bus by
performing the input/output write cycle by placing the data and the dummy address onto the mutliplexed bus if the electronic device is coupled to the multiplexed bus and setting appropriate bits within a location register to store a location of the electronic device for a subsequent direct memory access transfer if the electronic device is coupled to the multiplexed bus, and alternatively
performing multiple input/output write cycles if the electronic device is coupled to an Industry Standard Architecture bus.

22. The method according to claim 17, wherein the multiplexed bus is a Peripheral Component Interconnect bus.

23. A system comprising:
a memory element;
a Peripheral Component Interconnect bus;
a direct memory access (DMA) device coupled to the Peripheral Component Interconnect bus, the DMA device issuing DMA requests; and
a bridge device coupled to the Peripheral Component Interconnect bus and the DMA device, the bridge device supports a direct memory access operation between the memory element and the DMA device by separating the direct memory access operation into a memory cycle and an input/output cycle.

24. The system according to claim 23, wherein the at least one control line coupled between the DMA device and the bridge device is dedicated to support communications solely between the DMA device and the memory element.

25. An apparatus configured to support a direct memory access transfer on a Peripheral Component Interconnect (PCI) bus between a main memory element and an electronic device, the apparatus comprising:
a plurality of direct memory access controllers capable of receiving a direct memory access request from the electronic device coupled to the PCI bus;
a state machine coupled to the plurality of direct memory access controllers, the state machine capable of coordinating the direct memory access transfer upon detecting that the plurality of direct memory access controllers have received the direct memory access request; and
an internal storage element coupled to the state machine, the internal storage element capable of collecting data during the direct memory access transfer.

26. The apparatus according to claim 25 further including a location register used to indicate if the electronic device is coupled to the PCI bus.

27. A computer system comprising:

a main memory element;

a multiplexed bus;

a first electronic device coupled to the multiplexed bus; and a bridge device coupled to the multiplexed bus and the first electronic device, the bridge enabling a direct memory access operation between the first electronic device and the main memory element by separating the direct memory access operation into at least a memory cycle and an input/output cycle.

28. The computer system according to claim 27 further comprising:

a system controller coupled to the main memory element.

* * * * *

UNITED STATES PATENT AND TRADEMARK OFFICE
CERTIFICATE OF CORRECTION

PATENT NO. : 5,805,842
DATED : September 8, 1998
INVENTOR(S) : Nagaraj, et. al.

It is certified that error appears in the above-identified patent and that said Letters Patent is hereby corrected as shown below:

Column 5, line 64, delete "trough" and insert --through--.

Signed and Sealed this

Ninth Day of February, 1999

Attest:

*Acting Commissioner of Patents and Trademarks*

*Attesting Officer*